United States Patent
Morimura et al.

(10) Patent No.: US 11,423,324 B2
(45) Date of Patent: Aug. 23, 2022

(54) TRAINING AND ESTIMATION OF SELECTION BEHAVIOR OF TARGET

(71) Applicant: INTERNATIONAL BUSINESS MACHINES CORPORATION, Armonk, NY (US)

(72) Inventors: Tetsuro Morimura, Tokyo (JP); Yachiko Obara, Tokyo (JP); Takayuki Osogami, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1066 days.

(21) Appl. No.: 15/440,726

(22) Filed: Feb. 23, 2017

(65) Prior Publication Data
US 2018/0240037 A1    Aug. 23, 2018

(51) Int. Cl.
*G06N 20/00*        (2019.01)
*G06N 5/04*        (2006.01)
(Continued)

(52) U.S. Cl.
CPC .......... *G06N 20/00* (2019.01); *G06F 16/285* (2019.01); *G06F 16/355* (2019.01); *G06F 16/90324* (2019.01); *G06N 5/022* (2013.01); *G06N 5/04* (2013.01); *G06N 7/005* (2013.01); *G06Q 30/02* (2013.01); *G06Q 30/0202* (2013.01)

(58) Field of Classification Search
CPC .............................. G06N 20/00; G06F 16/285
See application file for complete search history.

(56) References Cited

U.S. PATENT DOCUMENTS

| | | |
|---|---|---|
| 8,799,186 B2 | 8/2014 | White et al. |
| 9,311,383 B1 | 4/2016 | Karty et al. |

(Continued)

FOREIGN PATENT DOCUMENTS

| | | | |
|---|---|---|---|
| CN | 106919619 A | * | 7/2017 |
| WO | 2009/135168 A1 | | 11/2009 |
| WO | 2011/035298 A2 | | 3/2011 |

OTHER PUBLICATIONS van Wezel, M., et al., "Improved customer choice predictions using ensemble methods", 2007, European Journal of Operational Research 181, p. 436-452, 2007 (Year: 2007).*

(Continued)

*Primary Examiner* — Brian M Smith
(74) *Attorney, Agent, or Firm* — Tutunjian & Bitetto, P.C.; Randall Bluestone

(57) ABSTRACT

A training method is provided. The training method includes clustering, by a processor, a plurality of items that each have an item attribute value, according to the item attribute value. The training method further includes generating, by the processor, for each item, a cluster attribute value corresponding to a cluster associated with the item. The training method also includes training, by the processor, an estimation model for estimating selection behavior of a target with respect to a choice set including two or more items, based on the cluster attribute value associated with each item included in the choice set, by using training data that includes a group of a choice set of items presented to the target and an item selected by the target from among the choice set.

15 Claims, 8 Drawing Sheets

(51) Int. Cl.
*G06F 16/28* (2019.01)
*G06F 16/9032* (2019.01)
*G06F 16/35* (2019.01)
*G06N 7/00* (2006.01)
*G06N 5/02* (2006.01)
*G06Q 30/02* (2012.01)

(56) References Cited

U.S. PATENT DOCUMENTS

| | | | |
|---|---|---|---|
| 10,366,344 | B1 | 6/2019 | Vasiloglou et al. |
| 2011/0270779 | A1 | 11/2011 | Showalter |
| 2017/0262523 | A1 | 9/2017 | Epstein et al. |

OTHER PUBLICATIONS

Elmaraghy, H., et al., "Managing variations in products, processes and manufacturing systems", 2009, CIRP Annals—Manufacturing Technology 58, p. 441-446, 2009 (Year: 2009).*

Koskimaki, H., et al., "Two-level Clustering Approach to Training Data Instance Selection: a Case Study For the Steel Industry", 2008 (Year: 2008).*

Yuan, D. et al., "HACS: Heuristic Algorithm for Clustering Subsets," Proc. of the 2007 SIAM Intl. Conf. on Data Mining (2007) pp. 617-622. (Year: 2007).*

Yamamoto, T., "A Multinomial Response Model for Varying Choice Sets, with Application to Partially Contested Multiparty Elections" (Apr. 2014) pp. 1-44, MIT Thesis.

Kamakura, W.A., "The Estimation of Multinomial Probit Models: A New Calibration Algorithm" Transportation Science (Nov. 1989) pp. 253-265, vol. 23, No. 4.

Otter, T. et al., "Sequential sampling models of choice: Some recent advances" Market Lett (Jul. 2008) pp. 1-13, vol. 19, No. 255.

Elmaraghy, H., et al., "Managing variations in products, processes and manufacturing systems," CIRP annals, Jan. 2009, pp. 441-446, 58.1.

Koskimaki, Heli, et al., "Two-level clustering approach to training data instance selection: a case study for the steel industry," 2008 IEEE International Joint Conference on Neural Networks (IEEE World Congress on Computational Intelligence), IEEE, Jun. 2008, pp. 3044-3049.

U.S. Office Action issued in U.S. Appl. No. 15/811,163 dated Nov. 4, 2019, 46 pages.

Office Action dated Sep. 9, 2020 issued in U.S. Appl. No. 15/811,163, 21 pages.

* cited by examiner

| MODEL | SALES PERIODS | | | | | | | | | AVERAGE | DECREASE | DECREASE RATE |
|---|---|---|---|---|---|---|---|---|---|---|---|---|
| | 1 | 2 | 3 | 4 | 5 | 6 | 7 | 8 | 9 | | | |
| RANDOM | 4.13 | 2.48 | 1.10 | 2.30 | 1.61 | 2.77 | 2.48 | 2.30 | 1.61 | 2.310 | - | - |
| BAESLINE | 4.24 | 2.33 | 1.13 | 2.23 | 1.63 | 2.77 | 2.44 | 2.27 | 1.46 | 2.277 | 0.034 | 1.00 |
| METHOD 1 | 4.24 | 2.33 | 1.12 | 2.23 | 1.63 | 2.78 | 2.44 | 2.27 | 1.41 | 2.273 | 0.037 | 1.11 |
| METHOD 2 | 4.27 | 2.33 | 1.07 | 2.26 | 1.63 | 2.73 | 2.41 | 2.28 | 1.30 | 2.255 | 0.055 | 1.65 |
| METHOD 3 | 4.24 | 2.33 | 1.10 | 2.25 | 1.63 | 2.77 | 2.45 | 2.28 | 1.40 | 2.272 | 0.038 | 1.14 |
| METHOD 4 | 4.24 | 2.33 | 1.12 | 2.23 | 1.63 | 2.77 | 2.44 | 2.27 | 1.44 | 2.276 | 0.035 | 1.03 |

FIG. 6

TRAINING AND ESTIMATION OF SELECTION BEHAVIOR OF TARGET

BACKGROUND

Technical Field

The present invention generally relates to model training, and particularly to training and estimation of selection behavior of a target.

Description of the Related Art

It has been conventionally known that various types of cognitive bias occur in the selection behavior of a person. Modeling and learning such selection behavior affected by cognitive bias is not without deficiencies.

For example, when a plurality of difference choice sets are generated from a plurality of different items, even if the selection behavior with respect to these choice sets is modeled, the number of parameters that must be learned increases, and the learning becomes difficult. Accordingly, there is a need for a simple method for modeling and learning selection behavior affected by cognitive bias.

SUMMARY

According to an aspect of the present invention, a training method is provided. The training method includes clustering, by a processor, a plurality of items that each have an item attribute value, according to the item attribute value. The training method further includes generating, by the processor, for each item, a cluster attribute value corresponding to a cluster associated with the item. The training method also includes training, by the processor, an estimation model for estimating selection behavior of a target with respect to a choice set including two or more items, based on the cluster attribute value associated with each item included in the choice set, by using training data that includes a group of a choice set of items presented to the target and an item selected by the target from among the choice set.

According to another aspect of the present invention, an estimating method is provided. The estimating method includes acquiring, by a processor, for each of a plurality of items that each have an item attribute value and are clustered according to the item attribute values, a cluster attribute value corresponding to a cluster associated with the item. The estimating method further includes acquiring, by the processor, an estimation model for estimating selection behavior of a target with respect to a choice set including two or more items, based on the cluster attribute value associated with each item included in the choice set. The estimating method also includes acquiring, by the processor, a new choice set of items presented to the target from among the plurality of items. The estimating method further includes estimating, by the processor, selection behavior of the target with respect to the new choice set, by using the estimation model, based on the cluster attribute value associated with each item included in the new choice set.

According to yet another aspect of the present invention, a computer program product for training an estimation model is provided. The computer program product includes a non-transitory computer readable storage medium having program instructions embodied therewith. The program instructions are executable by a computer to cause the computer to perform a method. The method includes clustering, by a processor, a plurality of items that each have an item attributable value, according to the item attributable values. The method further includes generating, by the processor, for each item, a cluster attribute value corresponding to a cluster associated with the item. The method also includes training, by the processor, an estimation model for estimating selection behavior of a target with respect to a choice set including two or more items, based on the cluster attribute value associated with each item included in the choice set, by using training data that includes a group of a choice set of items presented to the target and an item selected by the target from among the choice set of items.

According to still another aspect of the present invention, an apparatus is provided. The apparatus includes a processor. The processor is configured to cluster a plurality of items that each have an item attribute value, according to the item attribute value. The processor is further configured to generate for each item, a cluster attribute value corresponding to a cluster associated with the item. The processor is also configured to train an estimation model for estimating selection behavior of a target with respect to a choice set including two or more items, based on the cluster attribute value associated with each item included in the choice set, by using training data that includes a group of a choice set of items presented to the target and an item selected by the target from among the choice set.

According to still yet another aspect of the present invention, an apparatus is provided. The apparatus includes a processor. The processor is configured to acquire for each of a plurality of items that each have an item attribute value and are clustered according the item attribute values, a cluster attribute value corresponding to a cluster associated with the item. The processor is further configured to acquire an estimation model for estimating selection behavior of a target with respect to a choice set including two or more items, based on the cluster attribute value associated with each item included in the choice set. The processor is also configured to acquire a new choice set of items presented to the target from among the plurality of items. The processor is additionally configured to estimate selection behavior of the target with respect to the new choice set of items, by using the estimation model, based on the cluster attribute value associated with each item included in the new choice set.

The summary clause does not necessarily describe all necessary features of the embodiments of the present invention. The present invention can also be a sub-combination of the features described above.

BRIEF DESCRIPTION OF THE DRAWINGS

FIG. 6 shows an example of results obtained by evaluating the training apparatus 100 according to an embodiment of the present invention;

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

It is known that, in behavior of targets such as a person or an animal that is presented with a choice set and selects any one of the choices on the basis of preferences and the like, selection results of the selection behavior change according to the choice set. In an embodiment of the present invention, as an example of such selection behavior, selection behavior of a consumer serving as the target to select one commodity from among a plurality of commodities is described.

When a consumer selects one commodity out of a plurality of commodities, selection behavior of this consumer has various types of cognitive bias. For example, when a plurality of commodities including a first commodity and a second commodity are presented to the consumer as a choice set, a ratio of probabilities that the respective first and second commodities are selected by the consumer is sometimes different according to the other commodities included in the presented choice set. In this case, the presence of the other commodities included in the presented choice set adds a cognitive bias to the selection behavior of the consumer.

Figure 1:
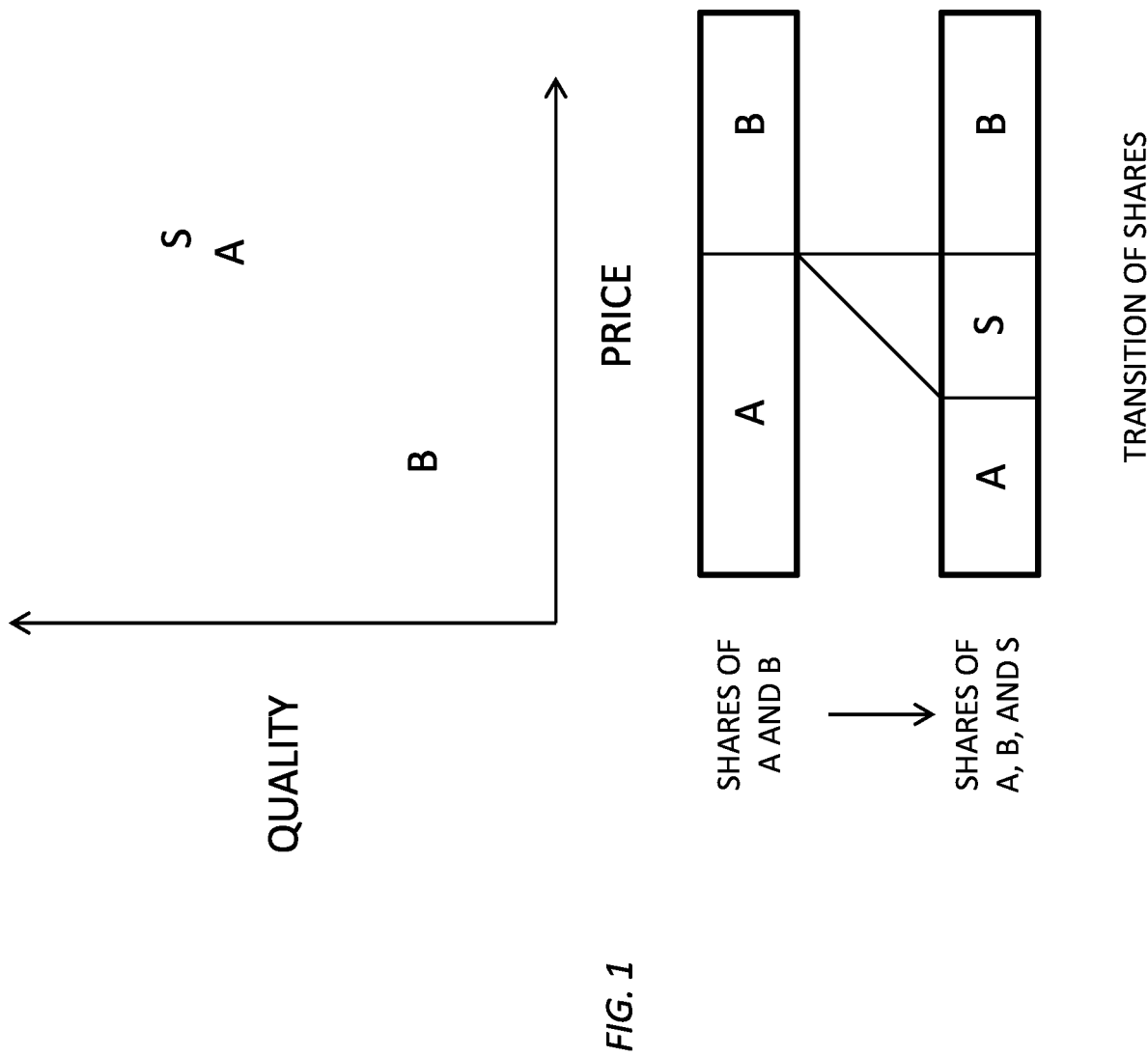
FIG. 1 shows a first example of a cognitive bias according to an embodiment of the present invention.

FIG. 1 shows a first example of a cognitive bias according to an embodiment of the present invention. FIG. 1 is a diagram for explaining a similarity effect, which is the cognitive bias in an embodiment of the present invention. In FIG. 1, commodities A, B, and S are a choice set presented to the consumer. In the graph of FIG. 1, as an example of characteristics of the commodities, the price is plotted on the horizontal axis and the quality of the commodities A, B, and S are plotted on the vertical axis. That is, the commodity A is a commodity having a higher price and higher quality compared to the commodity B. The commodity S is a commodity similar to the commodity A, which has a higher price and higher quality compared to the commodity B.

First, when the commodity A and the commodity B are a choice set in the market, shares of the commodities A and B are determined according to probabilities that the respective commodities A and B are selected by the consumer. When the commodity S is added to the market, since the commodity S is similar to the commodity A, the share of the commodity A is sometimes reduced, thereby changing a ratio of the shares of the commodities A and B. That is, in this case, with respect to the choice set of the commodities A and B, the presence of the commodity S that is similar to the commodity A creates a cognitive bias in the selection behavior of the consumer such that the share of the commodity A is divided among the commodities A and S. Such an effect of cognitive bias is called a similarity effect.

Figure 2:
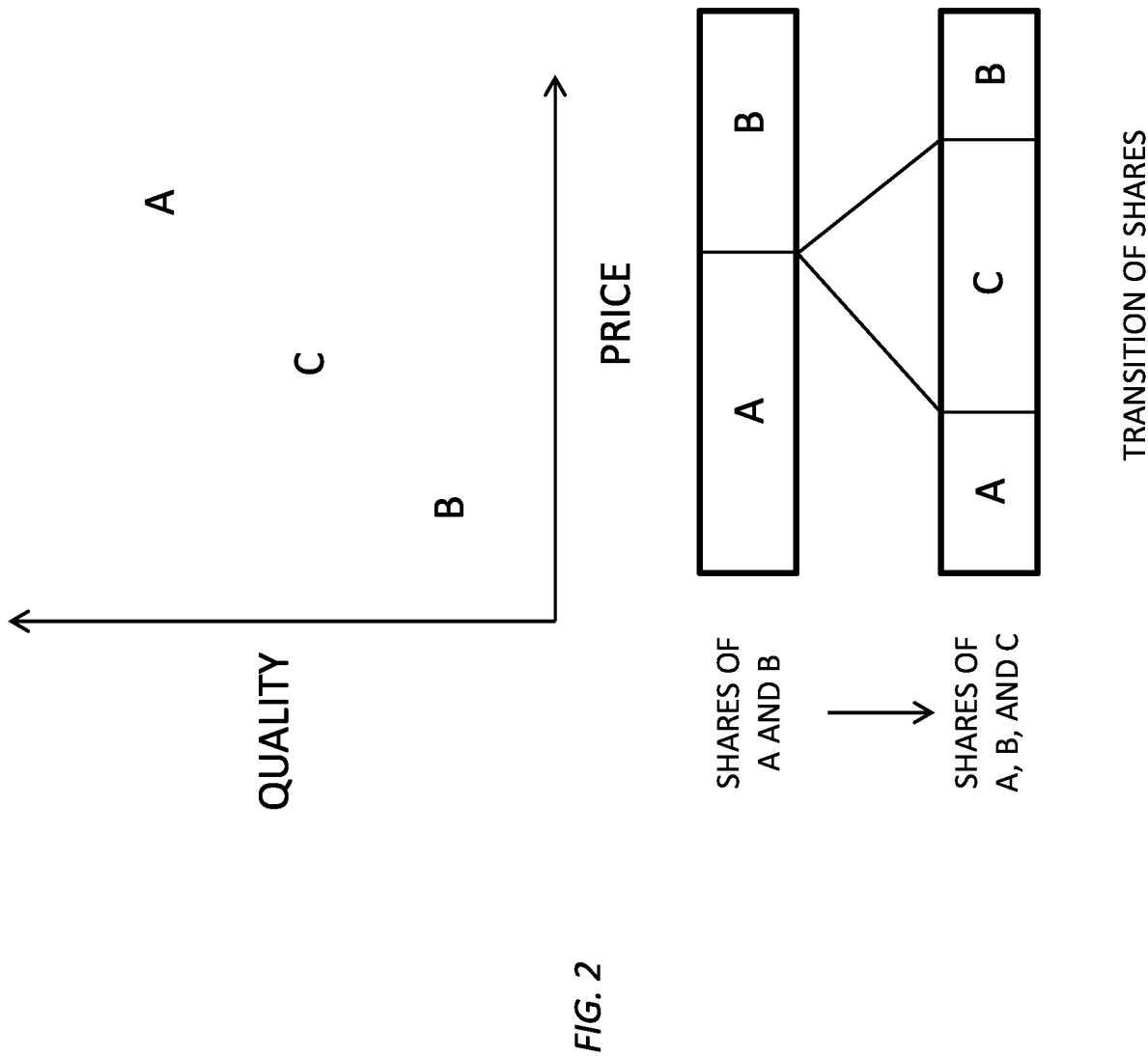
FIG. 2 shows a second example of a cognitive bias according to an embodiment of the present invention.

FIG. 2 shows a second example of the cognitive bias according to an embodiment of the present invention. FIG. 2 is a diagram for describing a compromise effect, which is the cognitive bias in an embodiment of the present invention. In FIG. 2, commodities A, B, and C are a choice set presented to the consumer. In the graph of FIG. 2, as in FIG. 1, as an example of characteristics of the commodities, a price is plotted on the horizontal axis and the quality of the commodities A, B, and C are plotted on the vertical axis.

That is, the commodity A is a commodity having a higher price and higher quality compared to the commodity B. The commodity C is a commodity having a lower price and lower quality compared to the commodity B.

First, when the commodity A and the commodity B are a choice set in the market, shares of the commodities A and B are determined according to probabilities that the respective commodities A and B are selected by the consumer. When the commodity C is added to the market, prices and degrees of quality of the commodities A, B, and C are arranged in the stated order. In this way, by adding commodity C that has an intermediate price and quality, the shares of both commodity A and commodity B are sometimes reduced, and a change in the ratio of shares among a plurality of products occurs.

For example, with respect to the choice set of the commodities A and B, the presence of the intermediate commodity C causes some of the consumers who chose commodity A and some of the consumers who chose commodity B to choose this commodity C. As a result, the share of the commodity C having the intermediate price and the intermediate quality is improved. Such an effect of adding a cognitive bias to the selection behavior of the consumer with the commodity C is called a compromise effect.

Figure 3:
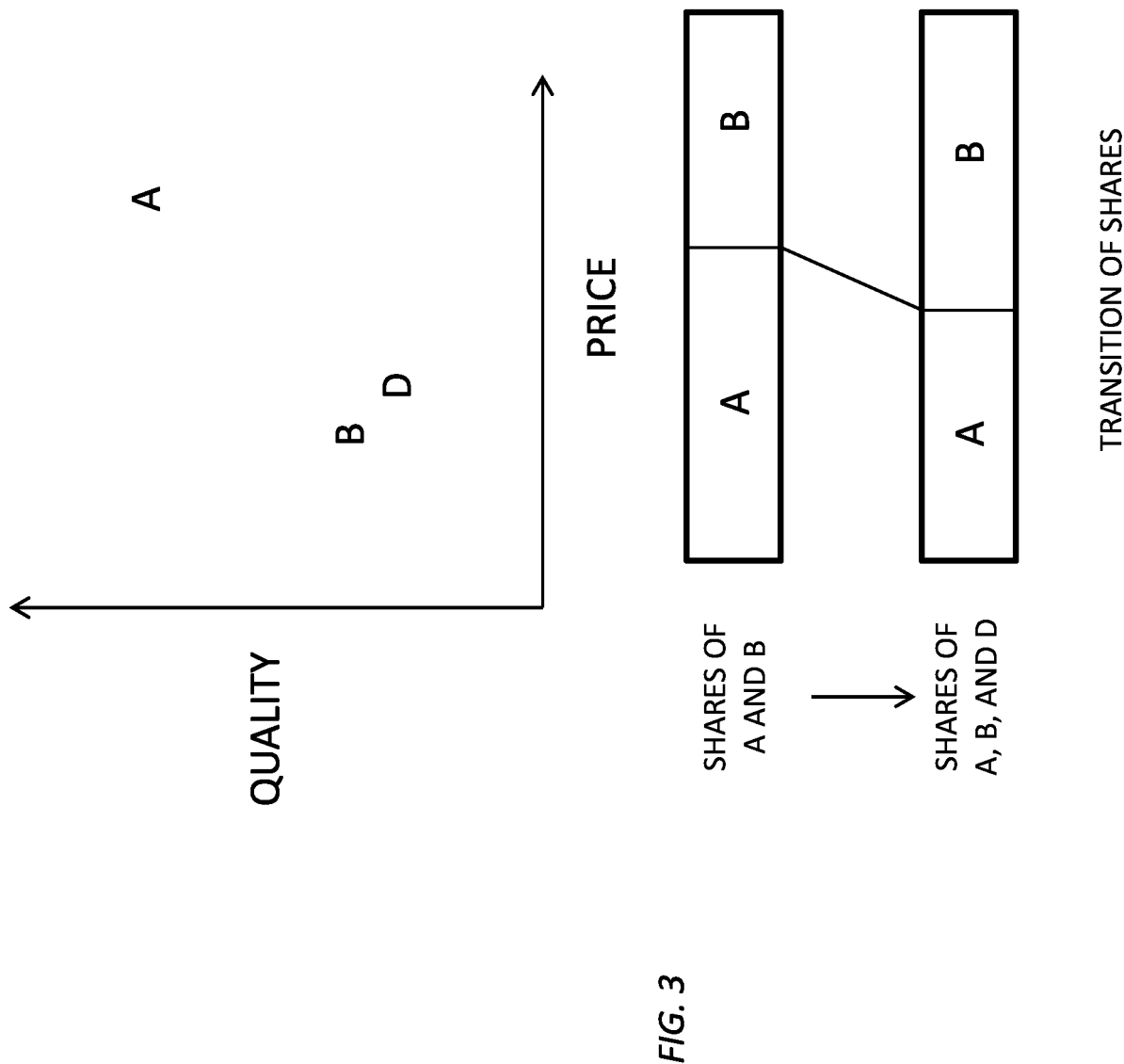
FIG. 3 shows a third example of a cognitive bias according to an embodiment of the present invention.

FIG. 3 shows a third example of the cognitive bias according to an embodiment of the present invention. FIG. 3 is a diagram for describing an attraction effect, which is the cognitive bias in an embodiment of the present invention. In FIG. 3, commodities A, B, and D are a choice set presented to the consumer. In the graph of FIG. 3, as in FIG. 1, as an example of characteristics of the commodities, a price is plotted on the horizontal axis and the quality of the commodities A, B, and D is plotted on the vertical axis. That is, the commodity A is a commodity having a higher price and higher quality compared to the commodity B. The commodity D is a commodity having a slightly higher price and slightly lower quality compared to the commodity B.

First, when the commodity A and the commodity B are a choice set in the market, shares of the commodities A and B are determined according to probabilities that the respective commodities A and B are selected by the consumer. When the commodity D is added to the market, since the commodity B has a relatively lower price and higher quality than the commodity D, the share of the commodity B is sometimes increased, thereby changing a ratio of the shares of the commodities A and B.

That is, in this case, with respect to the choice set of the commodities A and B, the presence of the commodity D that is slightly inferior to the commodity B both in the price and the quality adds a cognitive bias to the selection behavior of the consumer such that a favorable impression is given to the price and the quality of the commodity B. Such an effect of the cognitive bias is called an attraction effect.

As shown in the three examples explained above, various types of cognitive bias are added to the selection behavior of a consumer in the marketplace, and as a result, the shares or the like of the commodities are determined. Accordingly, when analyzing the consumption behavior of a consumer, recommending commodities to a consumer, or the like, it is preferable to use a model that takes such cognitive bias into consideration. Furthermore, even when a model is made for cognitive bias, if a plurality of models are required, it becomes difficult to analyze the selection behavior. In particular, when there are a plurality of choices in a set, the number of parameters that must be learned increases, and the learning becomes difficult.

For example, when selling a condominium lot divided among a plurality of periods, different combinations of dwelling units are sold to consumers in each period. In this case, when the dwelling units in the condominium are classified according to characteristics such as price, number of floors, direction that the room faces, floor space, whether the room is a corner room, and the like, there are no dwelling units that have the same characteristics. The combinations of dwelling units (choice set) presented to the consumers during each sales period differs according to the period. Furthermore, not all of the choices in a choice set presented during one period will necessarily be sold, and therefore the same item might be included among the plurality of items included in different choice sets. In this case, the cognitive biases affecting the consumers differ according to the items included in a choice set, and therefore different cognitive biases must be considered for the same item according to the choice sets, and this makes learning difficult.

A condominium sales company preferably provides a choice set during each sales period that combines the preferences, needs, cognitive biases, and the like of the consumers, such that there are no dwelling units that remain unsold, for example. Furthermore, since it is difficult for the consumers to comparatively consider the dwelling units by viewing a list of all of the dwelling units, it is preferable that each consumer be able to select a dwelling unit from a choice set that matches the preferences, needs, and the like of the consumer. In this way, it is desirable that learning in a manner to extract groups of choice sets from differing items by considering cognitive bias be able to be performed without a complex calculation or analysis.

Figure 4:
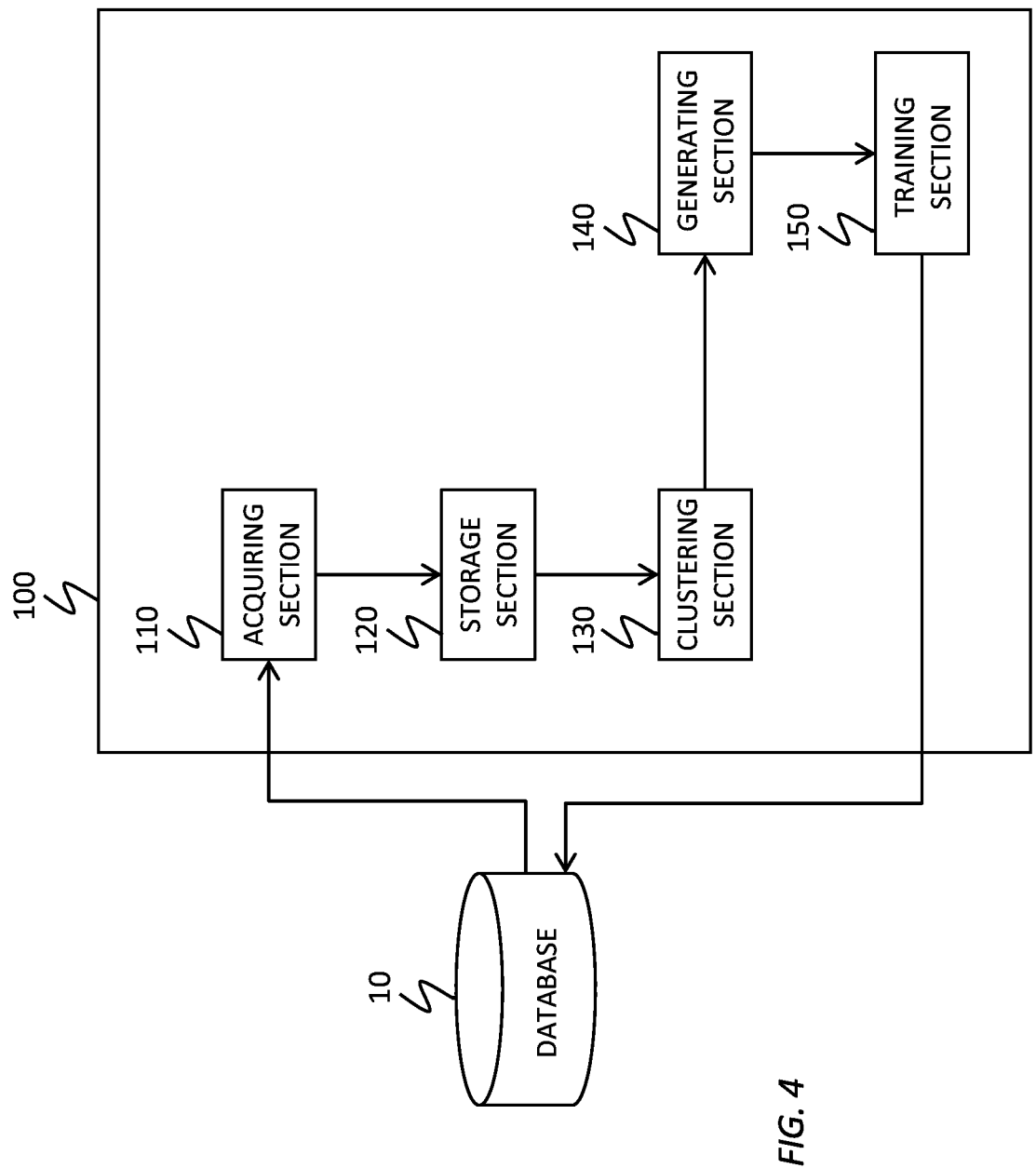
FIG. 4 shows an exemplary configuration of the training apparatus 100 according to an embodiment of the present invention, along with an external database 10.

The training apparatus 100 according to an embodiment of the present invention easily performs such learning by using a model that clusters common characteristics among a plurality of items and reflects the trends of items having common characteristics. An embodiment of the present invention describes an example in which the training apparatus 100 is used to sell a condominium lot divided among a plurality of periods. FIG. 4 shows an exemplary configuration of the training apparatus 100 according to an embodiment of the present invention, along with an external database 10. The training apparatus 100 includes an acquiring section 110, a storage section 120, a clustering section 130, a generating section 140, and a training section 150.

The acquiring section 110 can be operable to acquire information of a plurality of items. The acquiring section 110 can be operable to acquire information of item attributes corresponding to each item. The acquiring section 110 can set one dwelling unit, which is a unit for sale in the condominium, as one item, and associate this one item with information of item attributes such as cost, number of floors, direction the room faces, floor space, and whether the room is a corner room.

Furthermore, the acquiring section 110 can be operable to acquire training data used for training the training apparatus 100. For example, the acquiring section 110 acquires training data that includes a group of a choice set of items provided to a target and items selected by the target from among the choice set. In other words, the acquiring section 110 can acquire, as the training data, combinations of a choice set presented to a consumer by picking out a plurality of items from among all of the items for sale and items that have actually been selected and purchased by the consumer.

Furthermore, the acquiring section 110 can be operable to acquire information of the sales period of the condominium, the number of sales periods, the number of items included in each choice set presented during each sales period, and the like. The acquiring section 110 can acquire information of a plurality of items or the like input by a user or the like, or can instead read and acquire data stored in a predetermined format. In this case, the acquiring section 110 is connected to a network or the like and can read and acquire the data from an external storage apparatus, server, or the like. The acquiring section 110 can acquire information or the like of items at positions differing from the position of the body of the training apparatus 100, and can supply information or the like of the acquired items to the body via a network.

For example, the acquiring section 110 accesses the server or the like and acquires the information or the like of items stored in this server. The acquiring section 110 can acquire the information or the like of the items from a site or the like supplied by a web site. The acquiring section 110 can be realized by a separate external apparatus and acquire the information or the like of the items as process before the processing of the training apparatus 100. FIG. 4 shows an example in which the acquiring section 110 acquires the information of the like of the items from the external database 10 via a network or the like. The acquiring section 110 can supply the storage section 120 with the information or the like of the acquired items.

The storage section 120 is connected to the acquiring section 110 and can be operable to store the information or the like of the items received from the acquiring section 110. The storage section 120 can store the information of the model generated by the training apparatus 100. The storage section 120 can store the data or the like that is used during the process of generating this model. The storage section 120 can supply the stored data to a requesting source, in response to each component in the training apparatus 100 making a request.

The clustering section 130 can be operable to cluster a plurality of items that each have an item attribute value, according to the item attribute values of the items. The clustering section 130 can classify a plurality of items into two or more clusters, based on the item attribute values corresponding to each of the plurality of items acquired by the acquiring section 110. The clustering section 130 can read the information of the plurality of items acquired by the acquiring section 110 from the storage section 120, or can instead receive this information from the acquiring section 110. The clustering section 130 can perform clustering by extracting corresponding items according to one or more item attribute values.

The clustering section 130 can classify items whose price is greater than a threshold price, from among the plurality of items, into one cluster, for example. The clustering section 130 can perform clustering by extracting corresponding items from among the plurality of items according to a plurality of item attribute values, such as the price of the item exceeding a threshold price, the number of floors exceeding a threshold number of floors, and the floor space exceeding a threshold floor space. The clustering section 130 can supply the storage section 120 with the clustering results to store these results, or can supply the generating section 140 with the clustering results.

The generating section 140 can be operable to generate a cluster attribute value corresponding to the cluster associated with each of the plurality of items. The cluster attribute value can have a value corresponding to the choice set of an item. Specifically, the generating section 140 can be operable to generate, for each item included in a choice set, a cluster associated with the item and a cluster attribute value corresponding to the choice set. The generating section 140 can be operable to generate cluster attributes in which the cluster attribute values are elements. The generating section 140 can be operable to generate an attribute vector, based on a plurality of attributes including item attributes and cluster attributes. The generating section 140 can supply the information of the generated cluster attribute values or the like to the storage section 120 and store this information in the storage section 120, or can supply the training section 150 with this information.

The training section 150 can be operable to train an estimation model that estimates selection behavior of a target with respect to a choice set including two or more items, using the training data acquired by the acquiring section 110. The training section 150 can be operable to train the estimation model based on the cluster attribute values generated by the generating section 140 in association with each item included in the choice set.

The estimation model can be operable to estimate the selection behavior of the target based on weighted sums obtained by weighting a plurality of attribute values for a plurality of attributes including item attributes and cluster attributes using a plurality of weights. The plurality of attributes can include, as the cluster attributes, attributes corresponding to different weights for different clusters. The training section 150 can perform training by adjusting a plurality of weights of the estimation model such that the estimation result obtained by the estimation model corresponds to the training data.

The training section 150 can be operable to output a plurality of weights, which are the training data, as a learning result. The training section 150 can be operable to output the learning result together with information of the cluster attributes. The training section 150 outputs the learning results to the external database 10, for example.

As described above, the training apparatus 100 can train the estimation model using the training data and the plurality of attributes including the item attributes and the cluster attributes. The following describes the training operation of such a training apparatus 100.

Figure 5:
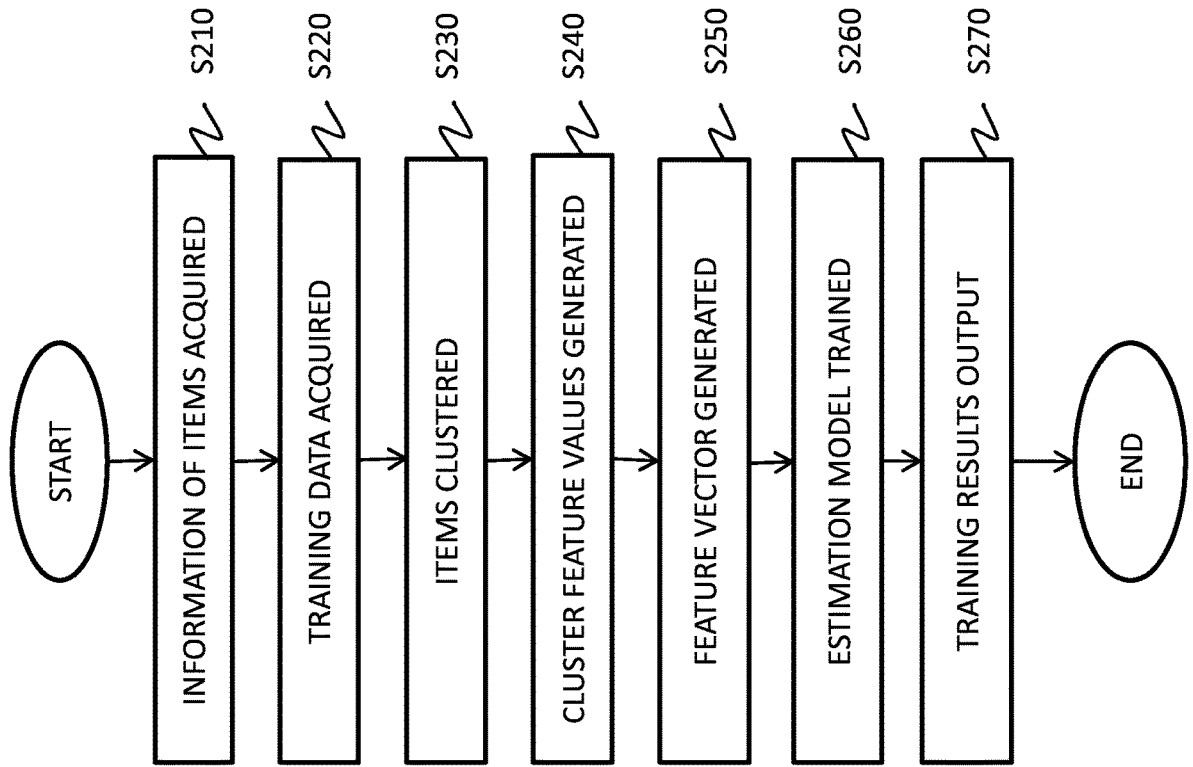
FIG. 5 shows an operational flow of the training apparatus 100 according to an embodiment of the present invention.

FIG. 5 shows an operational flow of the training apparatus 100 according to an embodiment of the present invention. By performing the operational flow shown in FIG. 5, the training apparatus 100 according to an embodiment of the present invention can learn the estimation model and calculate a probability corresponding to the learning result.

First, the acquiring section 110 acquires the information of a plurality of items (S210). For example, the acquiring section 110 acquires information of a total of L dwelling units that will possibly be presented to consumers. The acquiring section 110 can acquire an item attribute $\varphi_i^{(1)}$ corresponding to each dwelling unit i (i=1, 2, . . . , L). The item attribute $\varphi_i^{(1)}$ can be a vector having a plurality of attribute values that do not depend on the choice set. In an embodiment of the present invention, an example is described in which the item attribute $\varphi_i^{(1)}$ includes seven item attribute values, which are price, number of floors, the direction the room faces, floor space, whether the room is a corner room, whether the room is on the first floor, and whether the room is on the top floor.

The item attribute values can be normalized continuous values or can be binary values of 1 or 0. For example, the price, number of floors, and floor space are each an item attribute value that is a continuous value normalized to have an average value of 0 and a variance of 1. The direction that the room faces can be an item attribute value that is a continuous value determined by the direction in which a window installed in the living room faces, whereby the value is 1 when the window faces South, 0 when the window faces North, 0.5 when the window faces East or West, 0.75 when the window faces Southwest, and the like. Whether the room is a corner room, whether the room is on the first floor, and whether the room is on the top floor can each be an item attribute value that is 1 when the answer is "Yes" and 0 when the answer is "No."

Next, the acquiring section 110 acquires the training data (S220). The training data can include a group of a choice set including dwelling units from among the plurality of dwelling units i that are actually presented to consumers and dwelling units actually selected and purchased by consumers from the choice set. In an embodiment of the present invention, an example is described in which the training data is data generated based on the achieved sales of condominium units in nine sales periods from a first period to a ninth period. In this case, the training data is data in which a choice set $\Phi_1$ presented to consumers in the first sales period is associated with the dwelling units sold in the first sales period, for example. In this way, groups can be formed that include a choice set $\Phi_n$ presented in each sales period and the dwelling units sold in each sales period, which in the example results in data including nine groups (n=1, 2, . . . , 9).

Next, the clustering section 130 can cluster the plurality of items into a plurality of clusters, based on the item attribute values (S230). The clustering section 130 can cluster the items using a known clustering algorithm. The clustering section 130 can be operable to select a clustering algorithm from among a plurality of known clustering algorithms to perform the clustering of the items. The clustering section 130 can perform the clustering based on a known technique for data clustering such as affinity propagation and k-means clustering, for example. In an embodiment of the present invention, an example is described in which the clustering section 130 clusters the items into three clusters, which are "upper floor," "lower floor," and "corner room."

The upper floor cluster can include dwelling units that have an item attribute value indicating the top floor. In addition, the upper floor cluster can include dwelling units that have an item attribute value indicating a floor number that exceeds a predetermined first threshold value $F_1$. Similarly, the lower floor cluster can include dwelling units that have an item attribute value indicating the first floor, and can also include dwelling units that have an item attribute value indicating a floor number that is less than a predetermined second threshold value $F_2$. The corner room cluster can include dwelling units that have an item attribute value indicating a corner room, from among the dwelling units not included in an upper floor or a lower floor.

The clustering section 130 can attach a cluster number $c_i$ to each item i. For example, the clustering section 130 attaches a cluster number 1 to dwelling units associated with the upper floor cluster, attaches a cluster number 2 to dwelling units associated with the lower floor cluster, and attaches a cluster number 3 to dwelling units associated with the corner room cluster. Furthermore, if there is a dwelling unit that is not associated with any cluster, the clustering section 130 can attach a cluster number 0 to this dwelling unit. The number of clusters formed by the clustering section 130 is m. In an embodiment of the present invention, an example is shown in which m=3.

Next, the generating section 140 can generate the cluster attribute value for each item (S240). The generating section 140 can be operable to generate a plurality of element matrices in response to the cluster number $c_i$ of one dwelling unit i. The generating section 140 can generate a number of element matrices that is greater than or equal to the number m of clusters. The generating section 140 can set a k-th element matrix among the m element matrices as an identity matrix I, and set another of the remaining m-1 element matrices as a zero matrix O. Here, k is the cluster number $c_i$ of the one dwelling unit i.

The generating section 140 can be operable to generate, for one dwelling unit i, an element vector $\psi_{i,n}$ according to a choice set $\Phi_n$ including this dwelling unit i. The generating section 140 can generate a cluster attribute value of this one dwelling unit as the product of the element matrix and the element vector $\psi_{i,n}$. In this case, the generating section 140 can set the number of rows and the number of columns in the element matrix to be equal to the number of elements in the element vector $\psi_{i,n}$. The generating section 140 can be operable to calculate m cluster attribute values from the products of each of the m element matrices and the element vector $\psi_{i,n}$, and generate the cluster attribute $\varphi_i^{(2)}$ in which these m cluster attribute values are the elements.

$$\phi_i^{(2)} = \begin{bmatrix} I_{c_i=1}\psi_{i,n} \\ \vdots \\ I_{c_i=k}\psi_{i,n} \\ \vdots \\ I_{c_i=m}\psi_{i,n} \end{bmatrix} \quad \text{Expression 1}$$

$$I_{c_i=k} = \begin{cases} \text{identity matrix } I(c_i = k) \\ \text{zero matrix } O(c_i \neq k) \end{cases}$$

Among the element matrices, the position corresponding to the cluster associated with one dwelling unit i ($c_i$=k) is the identity matrix I, and therefore the cluster attribute $\varphi_i^{(2)}$ can become a vector having an element other than O at the position corresponding to the cluster associated with the one dwelling unit i.

The generating section 140 can be operable to generate the element vector $\psi_{i,n}$ in a manner to not depend on the choice set including the one dwelling unit i. The generating section 140 can be operable to generate a cluster attribute value including at least one of an average, a maximum, a minimum, and a range of item attribute values of each item included in the item choice set $\Phi_n$. For example, when the dwelling unit numbers of four dwelling units included in a choice set $\Phi_1$ presented to consumers in the first sales period are 1, 2, 3, and 5, for example, the generating section 140 can set the average values of the item attributes $\{\varphi_1^{(1)}, \varphi_2^{(1)}, \varphi_3^{(1)}, \varphi_5^{(1)}\}$ of these dwelling units to be the elements of the element vector $\psi_{i,n}$.

In this case, the generating section 140 can set the elements of the element vector $\psi_{i,n}$ to be this average value. For example, when a first item attribute $\varphi_1^{(1)}$ of a dwelling unit 1 included in the choice set $\Phi_1$ is (3,1) and a second item attribute $\varphi_2^{(1)}$ of a dwelling unit 2 included in the choice set $\Phi_1$ is (1,0), the generating section 140 sets the element vector $\psi_{i,n}$ to be an average vector (2, 0.5). In this way, the cluster attribute $\varphi_i^{(2)}$ of the one dwelling unit i becomes a vector having a value corresponding to the choice set that includes this one dwelling unit i at the position corresponding to the cluster associated with this one dwelling unit i. Here, an example is described in which the number of elements of the element vector $\psi_{i,n}$ is 2, but the present invention is not limited to this, and the number of elements can be a natural number greater than or equal to 2.

Next, the generating section 140 can generate the attribute vector $\varphi_i$ based on the item attribute $\varphi_i^{(1)}$ and the cluster attribute $\varphi_i^{(2)}$ for the one dwelling unit i (S250). The generating section 140 can generate a vector in which the elements that are the item attribute $\varphi_i^{(1)}$ and the cluster attribute $\varphi_i^{(2)}$ are arranged in order as the attribute vector $\varphi_i$, as shown in the expression below.

$$\phi_i = \begin{bmatrix} \phi_i^{(1)} \\ \phi_i^{(2)} \end{bmatrix} \quad \text{Expression 2}$$

Next, the training section 150 can train the estimation model using the attribute vector $\varphi_i$ and the training data (S260). The training section 150 can train the estimation model for estimating the selection behavior of a consumer based on a weighted sum obtained by weighting the elements of the attribute vector $\varphi_i$, i.e. the attribute values, with a plurality of weights. The training section 150 can train a multinomial logit model (MLM) as shown in the following expression, for example.

$$P(i|\Phi_n; w) = \frac{\exp(w^T \phi_i)}{\sum_{\phi_j \in \Phi_n} \exp(w^T \phi_j)} \quad \text{Expression 3}$$

Here, $P(i|\Phi_n; w)$ is the probability of an item i being selected from among the choice set $\Phi_n$, and w is a parameter vector in which the plurality of weight parameters are elements. The training section 150 can train the parameter vector w such that the group of the choice set $\Phi_n$ and $P(i|\Phi_n; w)$ corresponds to the training data. In other words, the training section 150 can calculate the probability $P(i|\Phi_n; w)$ using the weighted sum $w^T \varphi_i$ obtained by weighting the attribute values of the attribute vector $\varphi_i$ with a plurality of weight parameters, and can sequentially update the parameter vector w in a manner to correspond to the training data. The training section 150 can train the parameter vector w by applying a known training method such as a maximum likelihood estimation.

Here, the MLM is a model known as a multinomial selection model for calculating the probability of an item being selected from among a choice set including a plurality of items. In such a known multinomial selection model, the selection probability is calculated using attributes that do not depend on the clusters and choice sets, such as the item attribute $\varphi_i^{(1)}$, and therefore this model cannot calculate the selection probability while considering cognitive bias. In contrast to this, the training apparatus 100 uses the cluster attribute $\varphi_i^{(2)}$ depending on the clusters and choice set, in addition to the item attribute $\varphi_i^{(1)}$, and can therefore learn and calculate the selection probability while considering the cognitive bias.

The training apparatus 100 can output the training results to the outside (S270). The training apparatus 100 can output information of the parameter vector w after training, the cluster attribute $\varphi_i^{(2)}$, and the like to the external database 10 or the like. In this way, the training apparatus 100 can end the learning of the selection behavior of the target.

The training section 150 can be operable to perform training such that the selection probability $P(i|\Phi_n; w)$ of an item i actually selected by a consumer from among a choice set $\Phi_n$ becomes higher in a manner to correspond to the training data. The training section 150 can evaluate the selection probability $P(i|\Phi_n; w)$ using the evaluation index E shown in the following expression.

$$E = -\frac{1}{N}\sum_{n=1}^{N}\ln P(i|\Phi_n; w) \quad \text{Expression 4}$$

Here, N indicates the number of choice sets and i indicates the number of the selected item. A smaller value for the evaluation index E indicates that the estimation is more accurate. The following describes an example of results obtained by evaluating the estimation of the training apparatus 100 using such an evaluation index E.

FIG. 6 shows an example of results obtained by evaluating the training apparatus 100 according to an embodiment of the present invention. FIG. 6 shows the evaluation index E for a result obtained by the training apparatus 100 estimating the selection behavior of a consumer after the training apparatus 100 has been trained using the training data based on the sales achievements in the first to ninth sales periods. The numbers 1 to 9 shown in the row direction in FIG. 6 indicates the sales periods. The line indicated by "METHOD 1" shows an example of the evaluation index E of estimation results of the training apparatus 100 described above in an embodiment of the present invention.

For example, the evaluation index E of the training apparatus 100 during the first sales period is 4.24. This value indicates a value obtained by using Expression 4 to evaluate the estimation result of the training apparatus 100 for the selection behavior of consumers during the first sales period. The estimation result of the training apparatus 100 for the first sales period is a result obtained by calculating the selection probability of an item included in a choice set $\Phi_1$, which is a choice set presented to the consumers in the first sales period, after training was performed using the eight groups of training data corresponding to the second to ninth sales periods. In this way, FIG. 6 shows an example in which evaluation was performed on estimation results obtained by the training apparatus 100 estimating the selection behavior of consumers by performing cross-validation for each sales period.

FIG. 6 shows the rows labeled "RANDOM" and "BASELINE" as comparison targets. The row labeled "RANDOM" shows a result obtained by setting the selection probability P of each dwelling unit actually selected by a consumer to be 1/H, where H is the number of dwelling units included in the choice set presented during the corresponding sales period. In other words, "RANDOM" shows the evaluation index E obtained when the dwelling unit attributes and cognitive bias are not considered at all.

The row labeled "BASELINE" shows the evaluation index E obtained when the MLM shown in Expression 3 is trained using only the item attribute $\varphi_i^{(1)}$. The row labeled "BASELINE" also shows an example of results obtained by performing cross-validation for each sales period. In other words, "BASELINE" shows the evaluation index E obtained when the dwelling unit attributes are considered but cognitive bias is not considered at all.

The column labeled "AVERAGE" shows the average value of the evaluation index E from the first to ninth sales periods. The column labeled "DECREASE" shows the amount of decrease of the AVERAGE for each method compared to the AVERAGE of "RANDOM." A smaller value for the evaluation index E indicates a higher evaluation, and therefore a larger amount of decrease in the average value indicates that a higher evaluation was made. For example, the decrease amount of BASELINE is 0.034, and this indicates that the estimated selection probability has been improved relative to RANDOM. Furthermore, the decrease amount of METHOD 1 is 0.037, and this indicates that the training apparatus 100 according to an embodiment of the present invention was able to perform a more accurate estimation, by considering cognitive bias.

The column labeled "DECREASE RATE" shows the decrease rate when the DECREASE of BASELINE is set as 1. In other words, the DECREASE RATE of BASELINE is 1. The DECREASE RATE of METHOD 1 is 1.11, which indicates that the average value of the evaluation index E was improved by 11% by considering cognitive bias.

In the manner described above, the training apparatus 100 according to an embodiment of the present invention can reflect trends of different items that are similar types of items in the model, by using the cluster attributes associated with the items. In this way, even when the number of items presented in a choice set is increased, the training apparatus 100 can decrease the number of parameters being handled and learn using a small amount of computing power, by performing the clustering.

Furthermore, since the cluster attributes being used have cluster attribute values that reflect values depending on the choice set, the training apparatus 100 can learn the target selection behavior corresponding to a choice set. For example, by including the same item in different choice sets, the training apparatus 100 can also learn target selection behavior in which there is a different result for the selection probability.

Furthermore, since the training apparatus 100 uses the attribute vector $\varphi_i$ that includes the item attribute $\varphi_i^{(1)}$ and the cluster attribute $\varphi_i^{(2)}$ as elements, instead of the item attribute $\varphi_i^{(1)}$, it is possible to apply a known training technique such as a maximum likelihood estimation. Accordingly, the training apparatus 100 can perform training easily and with a simple method for the estimation model obtained by modeling selection behavior to include cognitive bias. An example of the training apparatus 100 was described in which cluster attributes are included as the attribute vector $\varphi_i$, but the present invention is not limited to this. The training apparatus 100 can be operable to perform learning that includes various attributes such as operations, characteristics, and environment to be learned.

The training apparatus 100 according to an embodiment of the present invention described above is an example in which the average value of the item attribute values of the dwelling units included in the choice set $\Phi_1$ is included as the cluster attribute value, but the present invention is not limited to this. As long as the cluster attribute $\varphi_i^{(2)}$ used by the training apparatus 100 is a vector having a value corresponding to the choice set that includes items, a maximum value, a minimum value, a difference between a minimum value and a maximum value, or the like can be included as the cluster attribute value, instead of the average value.

Instead, the cluster attribute value can be expressed as the result of a comparison between the average, maximum, minimum, and range of the item attribute value of each item included in the item choice set and the item attribute values associated with the items having this cluster attribute value. For example, the generating section 140 can set each element of the element vector $\psi_{i,n}$ to be the difference between the item attribute $\varphi_i^{(1)}$ of an item i and the average vector of the item attribute values of a plurality of items included in the choice set including the item i.

As an example, it is assumed that the numbers i of the dwelling units included in the choice set $\Phi_1$ presented to the consumers in the first sales period are i=1, 2, 3, 5. In this case, the generating section 140 can set the elements of the element vector $\psi_{1,n}$ to be the difference $\varphi_1^{(1)}-\varphi_{AVE}$ between the item attribute $\varphi_1^{(1)}$ and the average vector $\varphi_{AVE}$ ($\varphi_{AVE1}$, $\varphi_{AVE2}$, ... ) of the item attributes $\{\varphi_1^{(1)}, \varphi_2^{(1)}, \varphi_3^{(1)}, \varphi_5^{(1)}\}$ of these dwelling units. The training apparatus 100 can perform training using such a cluster attribute $\varphi_i^{(2)}$ in which the difference between an item attribute and the average vector is included as a cluster attribute value.

The row labeled "METHOD 2" in FIG. 6 shows an example of the evaluation index E of estimation results obtained by the training apparatus 100 using the difference between the item attribute and the average vector. The decrease amount of METHOD 2 is 0.055, indicating that the training apparatus 100 was also able to perform an accurate estimation using the difference between the item attribute and the average vector. Furthermore, the DECREASE RATE of METHOD 2 is 1.65, which indicates that the average value of the evaluation index E was improved by 65% by considering cognitive bias.

Instead, the cluster attribute value can include an attribute value relating to a cluster associated with an item included in an item choice set. For example, the cluster attribute value includes an attribute value indicating which cluster's item is included in an item choice set. In this case, the elements of the element vector $\psi_{1,n}$ can correspond to each cluster, and in response to an item being clustered in one cluster, the generating section 140 can set the corresponding element in the element vector $\psi_{1,n}$ to be a predetermined value.

As an example, it is assumed that the numbers i of the dwelling units included in the choice set $\Phi_1$ presented to the consumers in the first sales period are i=1, 2, 3, 5. Here, if all of the dwelling units 1, 2, 3, and 5 are clustered in a first cluster and not clustered in a second cluster, the generating section 140 can set the element vector $\psi_{1,n}$ to be (1, 0). If the dwelling units 1, 2, and 5 are clustered in the first cluster and the dwelling unit 3 is clustered in the second cluster, the generating section 140 can set the element vector $\psi_{1,n}$ to be (1, 1). The training apparatus 100 can perform training using such a cluster attribute $\varphi_i^{(2)}$ based on the element vector $\psi_{1,n}$.

The row labeled "METHOD 3" in FIG. 6 shows an example of the evaluation index E of estimation results obtained by the training apparatus 100 using an attribute value indicating which cluster's item the choice set includes. The reduction amount of METHOD 3 is 0.038, which indicates that, in this case as well, the training apparatus 100 was able to perform an accurate estimation. The DECREASE RATE of METHOD 3 is 1.14, which indicates that the average value of the evaluation index E was improved by 14% by considering cognitive bias.

Furthermore, the cluster attribute value can include a cluster value indicating the ratio of items of each cluster in the item choice set. In this case, the elements of the element vector $\psi_{1,n}$ correspond to each cluster, and according to the number of items clustered in one cluster, the generating section 140 can set the corresponding element of the element vector $\psi_{1,n}$ to be a value corresponding to this number of items.

As an example, it is assumed that the numbers i of the dwelling units included in the choice set $\Phi_1$ presented to the consumers in the first sales period are i=1, 2, 3, 5. Here, if all of the dwelling units 1, 2, 3, and 5 are clustered in a first cluster and not clustered in a second cluster, the generating section 140 can set the element vector $\psi_{1,n}$ to be (1, 0). If the dwelling units 1, 2, and 5 are clustered in the first cluster and the dwelling unit 3 is clustered in the second cluster, the generating section 140 can set the element vector $\psi_{1,n}$ to be (3/4, 1/4). The training apparatus 100 can perform training using such a cluster attribute $\varphi_i^{(2)}$ based on the element vector $\psi_{1,n}$.

The row labeled "METHOD 4" in FIG. 6 shows an example of the evaluation index E of estimation results obtained by the training apparatus 100 using an attribute value that includes the ratio of items in each cluster. The reduction amount of METHOD 4 is 0.035, which indicates that, in this case as well, the training apparatus 100 was able to perform an accurate estimation. The DECREASE RATE of METHOD 4 is 1.03, which indicates that the average value of the evaluation index E was improved by 3% by considering cognitive bias.

The training apparatus 100 according to an embodiment of the present invention described above is an example in which the clustering section 130 clusters a plurality of items. In this case, the clustering section 130 can be operable to perform the clustering operation according to instructions or the like from the outside. For example, the clustering section 130 can be operable to set, according to the instructions, at least one of the number of clusters into which the items are to be classified, the priority of a plurality of item attributes, and which of a plurality of clustering algorithms is to be used. In this case, the acquiring section 110 can further acquire instructions concerning the clustering operation from the outside and supply these instructions to the clustering section 130.

In the manner described above, the training apparatus 100 according to an embodiment of the present invention can perform training using the training data and estimate the selection behavior of consumers. By using the training results of such a training apparatus 100, it is possible to make other apparatuses or the like operable to estimate the selection behavior of consumers.

Figure 7:
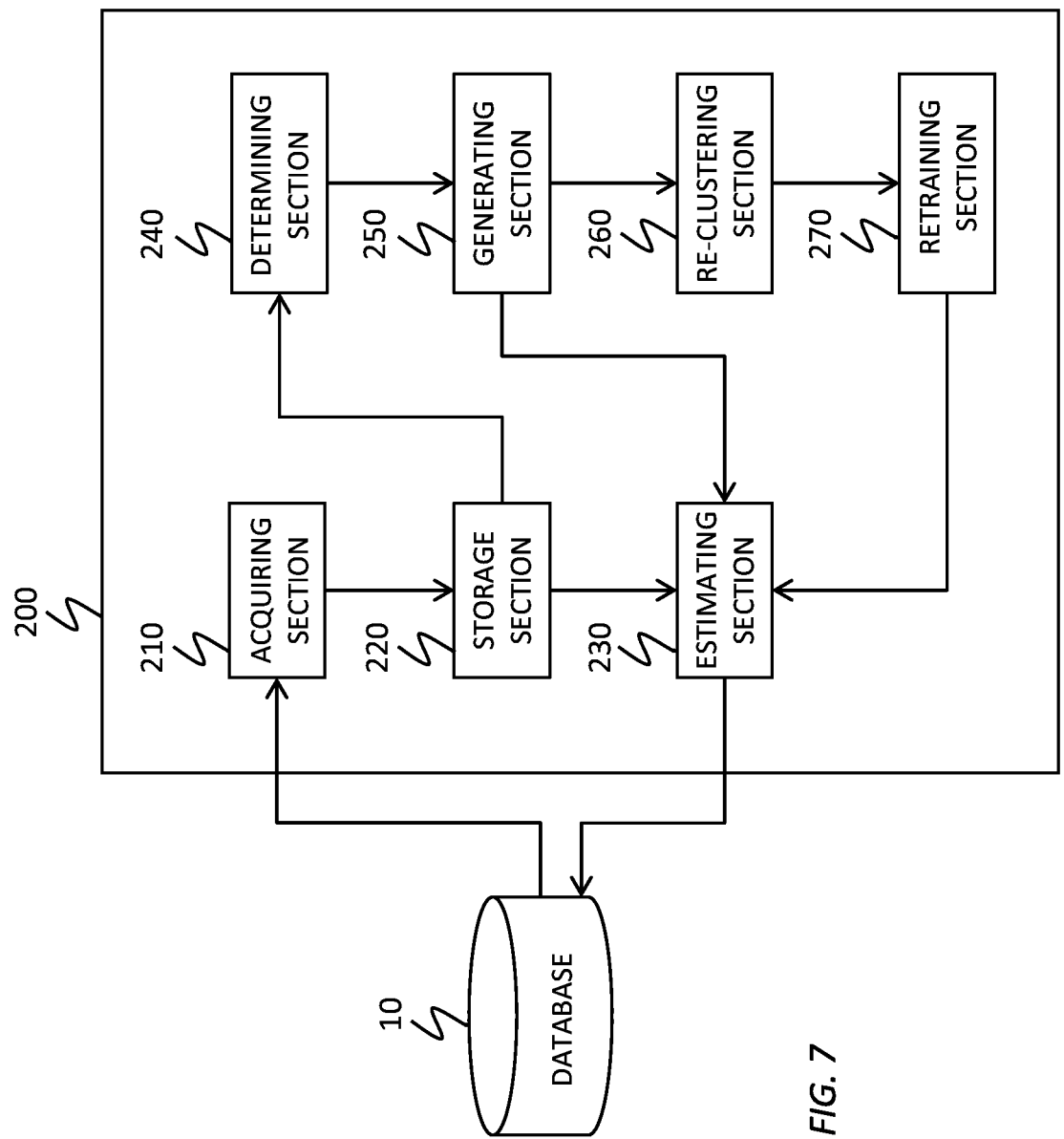
FIG. 7 shows an exemplary configuration of an estimation apparatus 200 according to an embodiment of the present invention along with the database 10.

FIG. 7 shows an exemplary configuration of an estimation apparatus 200 according to an embodiment of the present invention. The estimation apparatus 200 can be operable to acquire the learning results of the training apparatus 100 from the external database 10 or the like, and estimate the selection behavior of a target. The estimation apparatus 200 includes an acquiring section 210, a storage section 220, an estimating section 230, a determining section 240, a generating section 250, a re-clustering section 260, and a retraining section 270.

The acquiring section 210 can be operable to acquire information of a plurality of items. The acquiring section 210 can acquire information of items that each have an item attribute value and are clustered according to the item attribute values. The acquiring section 210 can, for each item, acquire a cluster attribute value corresponding to the associated cluster. The acquiring section 210 can acquire information such as the item attribute $\varphi_i^{(1)}$ and the cluster attribute $\varphi_i^{(2)}$, for example. The acquiring section 210 can also acquire information of a cluster.

The acquiring section 210 can be operable to acquire the estimation model for estimating the selection behavior of a target with respect to a choice set including two or more items, based on the cluster attribute value associated with each item included in the choice set. If the estimation model is an MLM, for example, the acquiring section 210 can acquire information relating to the parameter vector w after training. The acquiring section 210 can be operable to acquire a new choice set including items provided to a target, from among the plurality of items. In other words, the acquiring section 210 can be operable to acquire a result of the learning by the training apparatus 100 and information of a choice set that includes an item for which an estimation is to be made. The acquiring section 210 can supply the storage section 220 with the acquired item information or the like.

The storage section 220 is connected to the acquiring section 210 and can be operable to store the information or the like received from the acquiring section 210. The storage section 220 can store information to be processed by the estimation apparatus 200. The storage section 220 can supply the stored data to a requesting source, in response to each component in the estimation apparatus 200 making a request.

The estimating section 230 can be operable to estimate the selection behavior of a target with respect to the new choice set, using the estimation model, based on the cluster attribute value associated with each item included in the new choice set. The estimating section 230 can calculate the selection probability of an item included in the choice set, based on information of the choice set and the learning results of the training apparatus 100 acquired by the acquiring section 210. For example, the estimating section 230 substitutes the attribute vector $\varphi_i$ of Expression 2 and the parameter vector that has been learned into Expression 3, calculates the selection probability $P(i|\Phi_n; w)$ of an item i (i.e, a dwelling unit i) included in the choice set $\Phi_n$, and outputs the result as the estimation result.

The estimating section 230 can output the estimation result to the database 10 or the like, or instead of this or in addition to this, can output the estimation result to a display apparatus or the like. In this way, the estimation apparatus 200 according to an embodiment of the present invention can accurately estimate the selection behavior of a target corresponding to a choice set $\Phi_n$, by using the training results of the training apparatus 100 or the like. Such an estimation apparatus 200 can be operable to add new items, by being provided with the determining section 240 and the generating section 250. In this case, the acquiring section 210 can be operable to acquire the item attribute values of the new items.

The determining section 240 can be operable to determine which of the plurality of clusters a new item is associated with, by using the item attribute values of the new item. The determining section 240 can perform clustering into known clusters, by using the item attribute values of the new item. The determining section 240 can perform clustering in the same manner as the clustering section 130 of the training apparatus 100. The clustering performed by the determining section 240 is the same as the clustering operation described in relation to the training apparatus 100, and is therefore not described here.

The generating section 250 can be operable to generate a cluster attribute value corresponding to the associated cluster, for the new item. The generating section 250 can be operable to generate the cluster attribute value in the same manner as the generating section 140 of the training apparatus 100. The operation of the generating section 250 is the same as the operation described in relation to the training apparatus 100, and is therefore not described here.

In this way, the generating section 250 generates the cluster attribute value for the new item, and therefore the estimating section 230 can estimate the target selection behavior for a new choice set that includes the new item. In other words, the estimating section 230 can substitute the newly generated attribute vector $\varphi_i$ and the parameter vector that has been learned into Expression 3, calculate the selection probability $P(i|\Phi_n; w)$ of the new item i included in the choice set $\Phi_n$, and output the result as the estimation result.

Furthermore, the estimation apparatus 200 can be operable to add a new item that cannot be clustered into a known cluster, by being provided with the re-clustering section 260 and the retraining section 270. In this case, the determining section 240 can be operable to determine that the new item is not associated with any of the plurality of clusters.

The re-clustering section 260 can be operable to re-cluster the plurality of items including the new item, in response to the determining section 240 determining that the new item is not associated with any of the plurality of clusters. The re-clustering section 260 can perform the re-clustering using the item attribute values of the plurality of items including the new item. The re-clustering section 260 can perform the clustering in the same manner as the clustering section 130 of the training apparatus 100.

In this case, the generating section 250 can be operable to, after the re-clustering section 260 has performed the re-clustering, generate a cluster attribute value corresponding to the associated cluster for each item in the plurality of items. Since the cluster attribute values generated by the generating section 250 are based on the results of the new clustering, there are cases where the estimation accuracy is reduced when the parameter vector w learned before the re-clustering is used.

Therefore, the retraining section 270 can be operable to retrain the estimation model. In this case, the retraining section 270 can perform the retraining using training data that includes information of the new item. In other words, the acquiring section 210 can be operable to acquire new training data. The new training data can be data that includes groups of an item choice set including the new item provided to a target and the items selected by the target from among the choice set. The retraining section 270 can perform training in the same manner as the training section 150 of the training apparatus 100.

In this way, the re-clustering section 260 and the retraining section 270 perform re-clustering for a new item and retrain the estimation model, and therefore the estimating section 230 can estimate the selection behavior of a target with respect to a new choice set including the new item. In other words, the estimating section 230 can substitute the newly generated attribute vector $\varphi_i$ and the newly learned parameter vector into Expression 3, calculate the selection probability $P(i|\Phi_n; w)$ of the new item i included in the choice set $\Phi_n$, and output the result as the estimation result.

The estimation apparatus 200 according to an embodiment of the present invention is an example in which the estimation apparatus 200 calculates the selection probability of an item included in a choice set and outputs the result as the estimation result. However, the operation of the estimation apparatus 200 is not limited to the operation of estimating the selection behavior of a target. The estimation apparatus 200 can calculate the selection probability of an item included in a plurality of different choice sets, and can therefore search for a choice set in which the selection probability of a certain item is high.

In other words, the estimation apparatus 200 can be operable to further generate a choice set of items for enabling a target to select a certain item, using the estimation model. In this case, the estimation apparatus 200 can generate a plurality of choice sets that each include the certain item and sequentially calculate the selection probability of the certain item in each of the generated choice sets. The estimation apparatus 200 can output the choice set that results in the highest selection probability, as the choice set for enabling selection of the certain item. In the same manner, the estimation apparatus 200 can be operable to search for a choice set that has a lower selection probability for a certain item.

In the descriptions concerning the training apparatus 100 and the estimation apparatus 200 according to the above embodiments, an example was used in which dwelling units in a condominium lot were used as the items included in a choice set, but the present invention is not limited to this. The training apparatus 100 and the estimation apparatus 200 can be operable to be applied when presenting a plurality of different choice sets from among a plurality of different items and predicting selection behavior or the like. For example, the training apparatus 100 and the estimation apparatus 200 can be applied to predicting selection behavior relating to trip planning, means of transportation, and the like. The training apparatus 100 and the estimation apparatus 200 can be applied to predictions of selection behavior for the sale of commodities or the like using a website, such as E-commerce.

Figure 8:
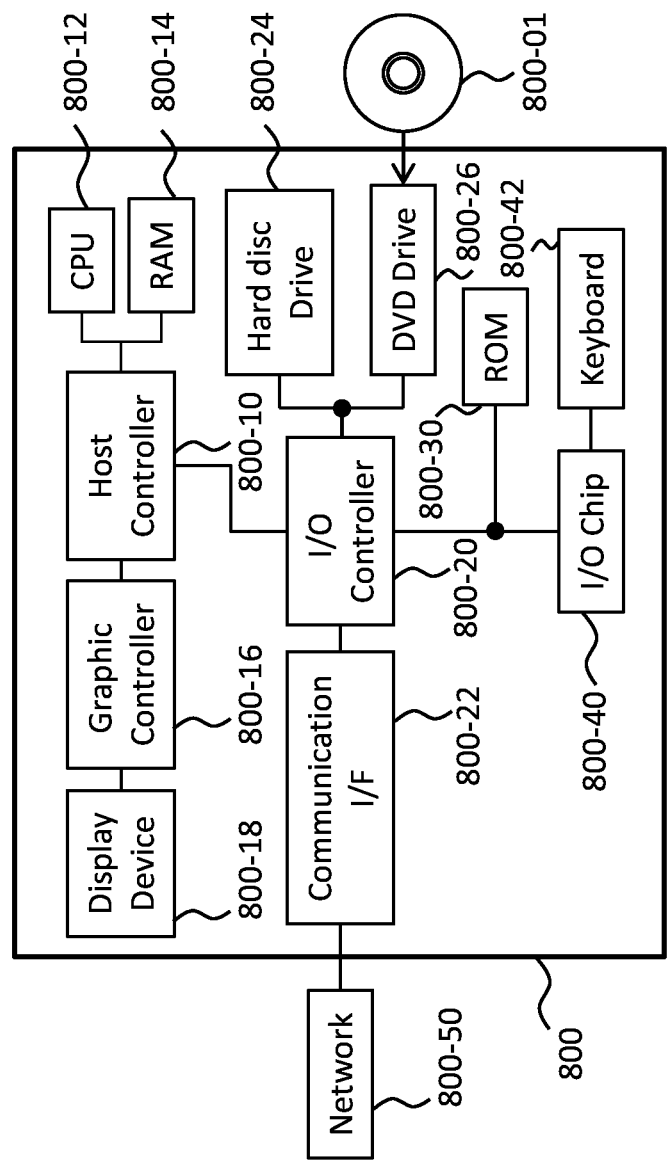
FIG. 8 shows an exemplary hardware configuration of a computer 800 according to an embodiment of the present invention.

FIG. 8 shows an exemplary hardware configuration of a computer configured for cloud service utilization, according to an embodiment of the present invention. A program that is installed in the computer 800 can cause the computer 800 to function as or perform operations associated with apparatuses of the embodiments of the present invention or one or more sections (including modules, components, elements, etc.) thereof, and/or cause the computer 800 to perform processes of the embodiments of the present invention or steps thereof. Such a program can be executed by the CPU 800-12 to cause the computer 800 to perform certain operations associated with some or all of the blocks of flowcharts and block diagrams described herein.

The computer 800 according to an embodiment of the present invention includes a CPU 800-12, a RAM 800-14, a graphics controller 800-16, and a display device 800-18, which are mutually connected by a host controller 800-10. The computer 800 also includes input/output units such as a communication interface 800-22, a hard disk drive 800-24, a DVD-ROM drive 800-26 and an IC card drive, which are connected to the host controller 800-10 via an input/output controller 800-20. The computer also includes legacy input/output units such as a ROM 800-30 and a keyboard 800-42, which are connected to the input/output controller 800-20 through an input/output chip 800-40.

The CPU 800-12 operates according to programs stored in the ROM 800-30 and the RAM 800-14, thereby controlling each unit. The graphics controller 800-16 obtains image data generated by the CPU 800-12 on a frame buffer or the like provided in the RAM 800-14 or in itself, and causes the image data to be displayed on the display device 800-18.

The communication interface 800-22 communicates with other electronic devices via a network 800-50. The hard disk drive 800-24 stores programs and data used by the CPU 800-12 within the computer 800. The DVD-ROM drive 800-26 reads the programs or the data from the DVD-ROM 800-01, and provides the hard disk drive 800-24 with the programs or the data via the RAM 800-14. The IC card drive reads programs and data from an IC card, and/or writes programs and data into the IC card.

The ROM 800-30 stores therein a boot program or the like executed by the computer 800 at the time of activation, and/or a program depending on the hardware of the computer 800. The input/output chip 800-40 can also connect various input/output units via a parallel port, a serial port, a keyboard port, a mouse port, and the like to the input/output controller 800-20.

A program is provided by computer readable media such as the DVD-ROM 800-01 or the IC card. The program is read from the computer readable media, installed into the hard disk drive 800-24, RAM 800-14, or ROM 800-30, which are also examples of computer readable media, and executed by the CPU 800-12. The information processing described in these programs is read into the computer 800, resulting in cooperation between a program and the above-mentioned various types of hardware resources. An apparatus or method can be constituted by realizing the operation or processing of information in accordance with the usage of the computer 800—

For example, when communication is performed between the computer 800 and an external device, the CPU 800-12 can execute a communication program loaded onto the RAM 800-14 to instruct communication processing to the communication interface 800-22, based on the processing described in the communication program. The communication interface 800-22, under control of the CPU 800-12, reads transmission data stored on a transmission buffering region provided in a recording medium such as the RAM 800-14, the hard disk drive 800-24, the DVD-ROM 800-01, or the IC card, and transmits the read transmission data to network 800-50 or writes reception data received from network 800-50 to a reception buffering region or the like provided on the recording medium.

In addition, the CPU 800-12 can cause all or a necessary portion of a file or a database to be read into the RAM 800-14, the file or the database having been stored in an external recording medium such as the hard disk drive 800-24, the DVD-ROM drive 800-26 (DVD-ROM 800-01), the IC card, etc., and perform various types of processing on the data on the RAM 800-14. The CPU 800-12 can then write back the processed data to the external recording medium.

Various types of information, such as various types of programs, data, tables, and databases, can be stored in the recording medium to undergo information processing. The CPU 800-12 can perform various types of processing on the data read from the RAM 800-14, which includes various types of operations, processing of information, condition judging, conditional branch, unconditional branch, search/replace of information, etc., as described throughout this description and designated by an instruction sequence of programs, and writes the result back to the RAM 800-14. In addition, the CPU 800-12 can search for information in a file, a database, etc., in the recording medium. For example, when a plurality of entries, each having an attribute value of a first attribute is associated with an attribute value of a second attribute, are stored in the recording medium, the CPU 800-12 can search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules can be stored in the computer readable media on or near the computer 800. In addition, a recording medium such as a hard disk or a RAM provided in a server system connected to a dedicated communication network or the Internet can be used as the computer readable media, thereby providing the program to the computer 800 via the network.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

While the embodiments of the present invention have been described, the technical scope of the invention is not limited to the above described embodiments. It is apparent to persons skilled in the art that various alterations and improvements can be added to the above-described embodiments.

As made clear from the above, an embodiment of the present invention can learn selection behavior of a target affected by cognitive bias, and can accurately estimate this selection behavior.

Further, in an embodiment of the present invention, once the selection behavior affected by the cognitive bias is learned, actions can be taken in response to the learned behavior. For example, if a potential e-commerce sale is learned, the apparatus can initiate a sales offer in response to the learned behavior on an e-commerce website. Further still, once the learned selection behavior is identified, the behavior can be stored by the computer into memory for use in future learned behavior methods. Additionally, once a selection behavior is learned from potential buyers of a given product, the given product can be automatically designed and constructed or presented in a particular physical layout (for sale, etc.) in accordance with the learned selection behavior. Also, once a selection behavior is learned from culturally similar groups, clothes can automatically be designed and fabricated in accordance with those learned selection behaviors. Further, once a selection behavior is learned from a group, an automatic point of sale device can stock the point of sale device with products in accordance with the learned selection behavior. For example, a vending machine disposed to provide products to a particular group, can automatically stock the products presented for sale in accordance with the learned selection behavior.

What is claimed is:

1. A computer program product for training an estimation model, the computer program product comprising a non-transitory computer readable storage medium having program instructions embodied therewith, the program instructions executable by a computer to cause the computer to perform a method comprising:
    clustering, by a processor, a plurality of items that each have an item attribute value, according to the item attribute values, wherein the items in each cluster have a characteristic in common represented by the item attribute value and each cluster is associated with a choice set from a plurality of choice sets;
    generating, by the processor, for each item, a cluster attribute value corresponding to a cluster associated with the item; and
    training, by the processor, an estimation model for estimating selection behavior of a target with respect to the choice set including two or more items, based on the cluster attribute value associated with each item included in the choice set, by using training data that includes a group of choice sets of differing items from the choice set presented to the target and an item selected by the target from among the choice set, wherein each cluster attribute value is a difference between an item attribute of each item in the choice set and an average vector of the item attribute values of all the items in the choice set.

2. The non-transitory computer-readable storage medium of claim 1, wherein the estimation model estimates a selection behavior of the target based on a weighted sum obtained by weighting, with different weights, a plurality of attribute values for a plurality of attributes including an item attribute and a cluster attribute, and the plurality of attributes include attributes corresponding to different weights for different clusters as the cluster attribute.

3. The non-transitory computer-readable storage medium of claim 1, wherein the clustering includes setting, according to instructions, at least one of a number of clusters into which the plurality of items are to be classified, priority of a plurality of item attributes, and which of a plurality of clustering algorithms is to be used.

4. The non-transitory computer-readable storage medium of claim 1, wherein the choice set is a subset of items of the plurality of items.

5. The non-transitory computer-readable storage medium of claim 4, wherein the program instructions executable by a computer further cause the computer to perform a method comprising estimating the selection behavior of a target with respect to a new choice set, using the estimation model, the estimation model being trained to account for cognitive bias, based on the cluster attribute value associated with each item included in the new choice set.

6. An apparatus comprising a processor configured to:
    cluster a plurality of items that each have an item attribute value, according to the item attribute value, wherein the items in each cluster have a characteristic in common represented by the item attribute value and each cluster is associated with a choice set from a plurality of choice sets;
    generate for each item, a cluster attribute value corresponding to a cluster associated with the item; and
    train an estimation model for estimating selection behavior of a target with respect to the choice set including two or more items, based on the cluster attribute value associated with each item included in the choice set, by using training data that includes a group of choice sets of differing items from the choice set presented to the target and an item selected by the target from among the choice set, wherein each cluster attribute value is a difference between an item attribute of each item in the choice set and an average vector of the item attribute values of all the items in the choice set.

7. The apparatus of claim 6, wherein the choice set is a subset of items of the plurality of items.

8. The apparatus of claim 7, wherein the processor is further configured to estimate the selection behavior of a target with respect to a new choice set, using the estimation model, the estimation model being trained to account for cognitive bias, based on the cluster attribute value associated with each item included in the new choice set.

9. An apparatus comprising:
    a processor configured to:
        acquire for each of a plurality of items that each have an item attribute value and are clustered according to the item attribute values, wherein the items in each cluster have a characteristic in common represented by the item attribute value and each cluster is associated with a choice set from a plurality of choice sets, a cluster attribute value corresponding to a cluster associated with the item;
        acquire an estimation model for estimating selection behavior of a target with. respect to a choice set including two or more items, based on the cluster attribute value associated with each item included in the choice set;

acquire an additional choice set of items presented to the target from among the plurality of items;

train, by the processor, the estimation model to estimate selection behavior of the target with respect to the additional choice set of items, by using the estimation model, based on the cluster attribute value associated with each item included in the additional choice set, wherein each cluster attribute value is a difference between an item attribute value of each item in the additional choice set and an average vector of the item attribute values of all the items in the additional choice set.

10. The apparatus of claim 9, wherein the processor is further configured to:

acquire an item attribute value of an additional item;

determine which cluster among a plurality of clusters the additional item is associated with, by using the item attribute value of the additional item; and generate, for the additional item, the cluster attribute value corresponding o the cluster associated with the additional item, wherein the processor is further configured to estimate the selection behavior of the target by estimating the selection behavior of the target for the additional choice set that includes the additional item.

11. The apparatus of claim 10, wherein the processor is further configured to re-cluster the plurality of items including the additional item, in response to a determination that the additional item is not associated with any of the plurality of clusters.

12. The apparatus of claim 11, wherein the processor is further configured to generate a cluster attribute value corresponding to the cluster associated with each item among the plurality of items, after the re-clustering, and to retrain the estimation model using training data that includes a group of choice sets of differing items from the choice set of items presented to the target and an item selected by the target from among the choice set of items.

13. The apparatus of claim 9, wherein the processor is further configured to generate a choice set of items for enabling the target to select a certain item, using the estimation model.

14. The apparatus of claim 9, wherein the choice set is a subset of items of the plurality of items.

15. The apparatus of claim 14, wherein the processor is further configured to estimate the selection behavior of a target with respect to a new choice set, using the estimation model, the estimation model being trained to account for cognitive bias, based on the cluster attribute value associated with each item included in the new choice set.

* * * * *